R. M. GRUSS.
SHOCK ABSORBER.
APPLICATION FILED MAR. 29, 1921.
1,424,721.
Patented Aug. 1, 1922.
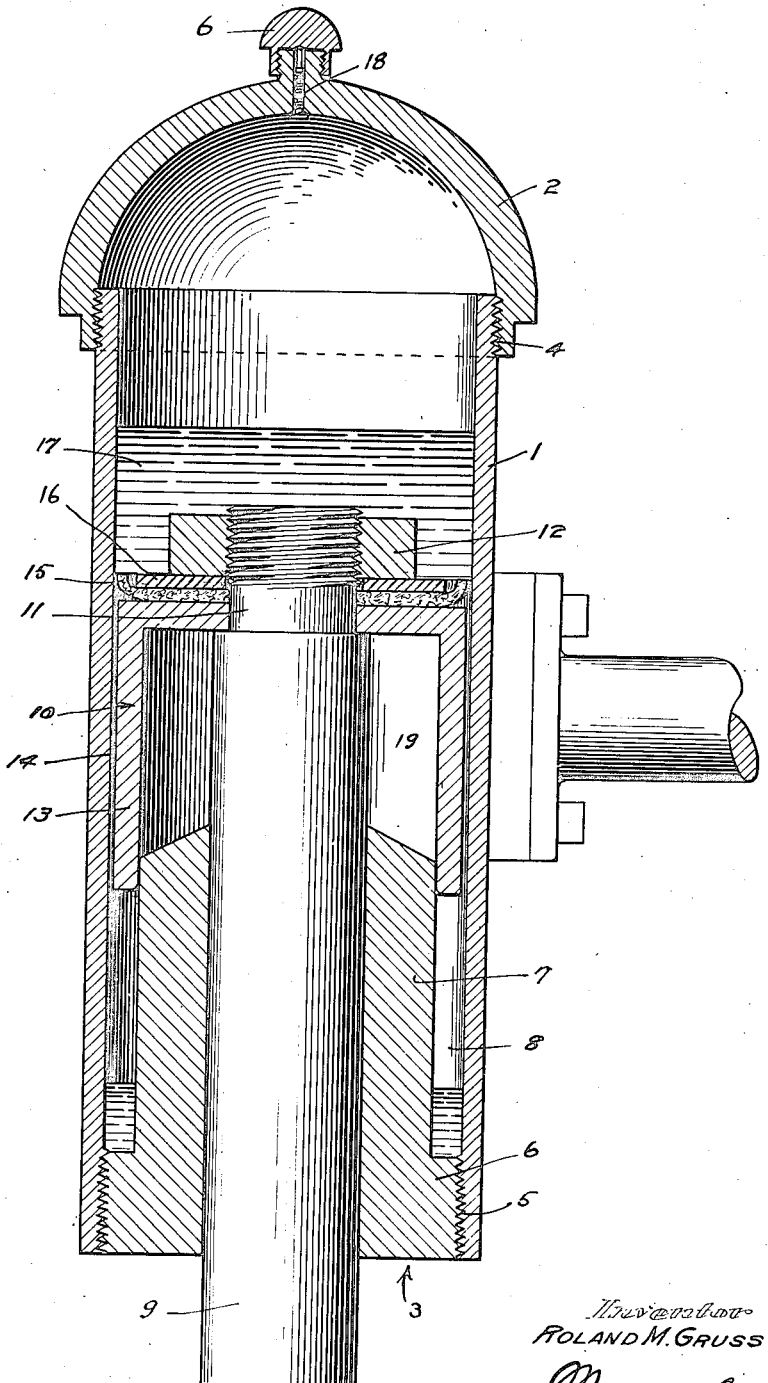
ROLAND M. GRUSS

UNITED STATES PATENT OFFICE.

ROLAND M. GRUSS, OF SAN FRANCISCO, CALIFORNIA, ASSIGNOR, BY DIRECT AND MESNE ASSIGNMENTS, TO DIAMOND AIR SPRINGS COMPANY, OF SAN FRANCISCO, CALIFORNIA, A CORPORATION OF CALIFORNIA.

SHOCK ABSORBER.

1,424,721.  Specification of Letters Patent.  Patented Aug. 1, 1922.

Application filed March 29, 1921. Serial No. 456,781.

*To all whom it may concern:*

Be it known that I, ROLAND M. GRUSS, a citizen of the United States, and resident of San Francisco, county of San Francisco, State of California, have invented a new and useful Shock Absorber, of which the following is a specification.

My invention relates in general to shock absorbers for motor vehicles and has reference more particularly to that type of shock absorbers which employ air as a cushioning medium.

The primary object of the invention is to provide an inexpensive yet most efficient device for absorbing the vibrations and shocks incident to the travel of a vehicle over an uneven road surface.

The invention possesses other features which will be apparent as the description proceeds with reference to the accompanying drawing in which the figure is a vertical section through a shock absorber embodying the salient features of the invention.

Referring now to the drawing in detail I prefer to produce the shock absorber from a cylinder (1) the respective ends of which being closed by a dome shaped cap (2) and a breech block (3). The end of the cylinder made to receive the dome (2) is preferably threaded as at (4) so that the dome may be screw threaded thereto. The opposite end of the cylinder has internal threads as at (5) so that the threads on the enlarged end (6) of the block (3) may engage the same to position the block within the cylinder. The block is, of course, cylindrical to correspond to the shape of the cylinder and the greater part of the length of the same is reduced in diameter as at (7) to leave a space (8) between the reduced part of the block and the walls of the cylinder. The block is further provided with a central bore made to receive the connecting rod (9) of the piston (10) which is mounted for reciprocation within the cylinder.

The horizontal top of the piston is made with an opening through which the reduced end (11) of the connecting rod extends and with a nut (12) made to engage the threads on the reduced end of the rod for connecting the piston to the rod. The piston includes as an essential part an elongated downwardly presented wall (13) cylindrical in shape to correspond to the cylinder but of a less diameter than that of the cylinder to leave a space (14) between the walls of the piston and the walls of the cylinder.

Positioned upon the top of the piston is a cup washer (15) with a plate (16) beneath the nut (12) and over-lying the washer and clamping the same tightly to the top of the piston. The plate (16) is preferably disk shaped and is of a less diameter than that of the washer and even the piston so as to leave the outer edge of the washer free to flex. The outer edge of the washer is turned upwardly and has a wiping contact with the inner walls of the cylinder and provides a seal for maintaining a supply of liquid preferably oil on top of the piston.

The top of the cylinder being closed by the dome (2) leaves a relatively large closed area in the top of the cylinder above the liquid supply. This area becomes a chamber which is filled to capacity with a head of air under pressure the same being introduced through the valve inlet (18) in the dome.

The elongated length of the block (3) provides a relatively long guide for the connecting rod (9) so that any tendency on the part of the piston to wobble in the cylinder is offset. Furthermore, this construction of the block provides a peculiar co-operative function with the piston in absorbing or cushioning shock on the downward stroke of the piston as will hereinafter follow. It might be appropriate to state that aside from the guide for the piston which is offered by the length of the central bore the telescoping effect between the walls of the piston and the block which is brought about by the space (8) also acts in the capacity of a guide. This is particularly true since the limit of the upward stroke of the piston need not be any further than that as shown, thus leaving the ends of the piston wall at all times slightly over-lapping the upper end of the block.

*Operation.*

The head of air in the top of the cylinder will act to resist an upward stroke of the piston consequently when an abnormal thrust, caused by a jar imparted to that part of the spring structure to which the rod (9) is connected, is imparted to the piston the same will be moved upwardly against the head of air with the desired cushioning effect realized. Should, for any reason, a leakage of the liquid pass the cup washer occur the same will gravitate through the space (14) and into the bottom of the space (8). The space (8) thus becomes a well for collecting the leakage of liquid. Should any great amount of the liquid accumulate in the well the same will be transferred or returned to the supply above the piston when the wall of the piston telescopes with the block upon a downward stroke of the piston.

The closed space (19) within the piston and which is sealed by the walls of the same over-lapping the edge of the block may be maintained at substantially atmospheric pressure and a cushioning effect may be realized by this source for a downward stroke of the piston and a rebound of the spring structure. It is of course to be appreciated that the return of the liquid from the well to the supply above the piston will also act in a secondary capacity as a cushioning medium.

The liquid as used primarily acts only as a seal for maintaining the head of air above the piston and is in no way relied upon as a primary cushioning medium even in combination with the air.

As is customary in devices of this kind the cylinder is usually connected to co-operate with one part of the spring structure and the piston with the other part. In some cases, however, either the cylinder or the piston is connected to the chassis of the vehicle with the other part of the device connected to the spring structure. In any event the cylinder should be positioned upright as shown.

I claim:

1. A shock absorber including a cylinder, a hollow piston having depending walls mounted for reciprocation in said cylinder, a breech block positioned within the lower part of the cylinder and adapted to telescope with said piston, the diameter of said block being less than that of the cylinder to leave an annular space around the block to receive the depending walls of the piston, the diameter of the piston being less than that of the cylinder to leave a space between their respective walls, a washer carried upon the top of the piston having a wiping contact with the cylinder wall, a supply of liquid within the cylinder above the piston and a head of air above the liquid; said head of air adapted to resist an upward movement of the piston in the cylinder and produce a cushion effect; the depending walls of the piston adapted to telescope within the space around the breech block upon a downward stroke of the piston.

2. A shock absorber comprising a closed cylinder, a piston mounted for reciprocation within the cylinder and dividing the same into upper and lower air cushioning chambers, a liquid supported above the piston in the upper chamber of the cylinder and a head of compressed air above said liquid, means carried by the piston to confine the liquid above the piston, and means in the lower chamber of the cylinder adapted to telescope with the depending walls of the piston to compress the air in said lower chamber and produce a cushioning effect upon a down-ward stroke of the piston.

3. A shock absorber comprising a closed cylinder, a piston mounted for reciprocation within the cylinder and dividing the same into upper and lower cushioning chambers, a liquid supported above the piston in the upper chamber of the cylinder and a head of compressed air above said liquid, the diameter of the piston being less than that of the cylinder to leave a space between the piston and the cylinder, means carried by the piston to confine the liquid above the piston, and means in the lower chamber of the cylinder capable of co-acting with the piston to produce a cushioning effect upon a downward stroke of the piston said means including a cylindrical block having a diameter less than that of the cylinder and adapted to telescope with the piston.

4. A shock absorber comprising a closed cylinder, a piston mounted for reciprocation within the cylinder and dividing the same into upper and lower cushioning chambers, a liquid supported above the piston in the upper chamber of the cylinder and a head of compressed air above said liquid, the diameter of the piston being less than that of the cylinder to leave a space between the piston and the cylinder, means carried by the piston to confine the liquid above the piston, and means in the lower chamber of the cylinder capable of co-acting with the piston to produce a cushion effect upon a downward strike of the piston, said means including a cylindrical block having a diameter less than that of the cylinder and adapted to telescope with the piston, said block having an enlarged threaded end adapted to have a threaded engagement with the end of the cylinder and closing the same.

5. A shock absorber comprising a closed cylinder, a piston mounted for reciprocation within the cylinder and dividing the same into upper and lower cushioning chambers, a liquid supported above the piston in the upper chamber of the cylinder and a head of compressed air above said liquid, the diameter of the piston being less than that of the cylinder to leave a space between the piston and the cylinder, means carried by the piston to confine the liquid above the piston, and means in the lower chamber of the cylinder capable of coacting with the piston to produce a cushioning effect upon a downward stroke of the piston, said means including a cylindrical block having a diameter less than that of the cylinder, and adapted to telescope with the piston, said block having an enlarged threaded end adapted to have a threaded engagement with the end of the cylinder and closing the same, and a central bore in said block through which the connecting rod of the pistons enters the cylinder.

ROLAND M. GRUSS.